US010817779B2

(12) United States Patent
Bourgoin et al.

(10) Patent No.: US 10,817,779 B2
(45) Date of Patent: Oct. 27, 2020

(54) BAYESIAN NETWORK BASED HYBRID MACHINE LEARNING

(71) Applicant: International Business Machines Corporation, Armonk, NY (US)

(72) Inventors: Elizabeth Bourgoin, Old Greenwich, CT (US); Christopher A. Buchholz, Port Chester, NY (US); Eric M. Kessler, New Rochelle, NY (US); Liyang Song, Mount Kisco, NY (US); Zhihuai Zhu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 15/690,672

(22) Filed: Aug. 30, 2017

(65) Prior Publication Data

US 2019/0065939 A1    Feb. 28, 2019

(51) Int. Cl.
*G06N 3/04* (2006.01)
*G06Q 40/08* (2012.01)
*G06N 3/08* (2006.01)
*G06N 7/04* (2006.01)
*G06N 7/00* (2006.01)

(52) U.S. Cl.
CPC ......... *G06N 3/0472* (2013.01); *G06N 3/0427* (2013.01); *G06N 3/0436* (2013.01); *G06N 3/0454* (2013.01); *G06N 3/08* (2013.01); *G06Q 40/08* (2013.01); *G06N 7/005* (2013.01); *G06N 7/046* (2013.01)

(58) Field of Classification Search
CPC ............... G06N 7/005; G06N 5/048

USPC ..................................... 706/15, 45
See application file for complete search history.

(56) References Cited

U.S. PATENT DOCUMENTS

| 7,272,586 | B2 * | 9/2007 | Nauck | G05B 13/0275 706/52 |
| 7,689,833 | B2 * | 3/2010 | Lange | G06K 9/00496 713/186 |
| 9,032,531 | B1 | 5/2015 | Scorvo et al. | |
| 9,231,979 | B2 | 1/2016 | Duke et al. | |
| 9,294,497 | B1 | 3/2016 | Ben-Or et al. | |
| 2007/0100724 | A1 * | 5/2007 | Hollas | G06Q 10/10 705/36 R |
| 2014/0205154 | A1 * | 7/2014 | De Souza | G06K 9/00657 382/110 |

OTHER PUBLICATIONS

Peter Mell, "The NIST Definition of Cloud Computing". Special Publication 800-145. Sep. 2011, pp. 1-7.

(Continued)

*Primary Examiner* — David R Vincent
(74) *Attorney, Agent, or Firm* — Samuel Waldbaum; Otterstedt, Wallace & Kammer, LLP (57) ABSTRACT

Data includes data with labels and data without labels. For data without labels a fuzzy rules system assigns pseudo labels. A computer processes the data with labels using a first cognitive neural network; processes the data with pseudo labels using a second cognitive neural network; and produces system outcomes by combining the results of the first and second cognitive neural networks. The computer obtains feedback on the system outcomes, and modifies parameters of the fuzzy rule system in response to the feedback.

20 Claims, 9 Drawing Sheets

(56) References Cited

OTHER PUBLICATIONS

John E. Kelly III, "Computing, cognition, and the future of knowing", IBM Corp. Oct. 2015. pp. 1-7.
Sunayan Bandyopadhyay et al., "Data mining for censored time-to-event data: A Bayesian network model for predicting cardiovascular risk from electronic health record data", arxiv.org:1404.2189v1. Apr. 2014. pp. 1-31.
IBM, "Using quantized probabilities to overcome the requirement of fully observed data in generic Bayesian networks structure learning algorithms", IP.com:IPCOM000183826D. Jun. 2009. pp. 1-4.
Anonymous, "Machine Learning Algorithms for Smart Meter Diagnostics", IP.COM:IPCOM000242462D . Jul. 2015. pp. 1-53.
Riyanarto Sarno et al., "Hybrid Association Rule Learning and Process Mining for Fraud Detection" IAENG International Journal of Computer Science 42 (2), Apr. 2015. pp. 59-72.
Punam Devidas Bagul et al., "Survey on Hybrid Approach for Fraud Detection in Health Insurance" International Journal of Innovative Research in Computer and Communication Engineering, vol. 4, issue 4. Apr. 2016. pp. 1-5.
Krisha Kumar Tripathi et al., "Hybrid Approach for Credit Card Fraud Detection" International Journal of Soft Computing and Engineering (IJSCE) ISSN: 2231-2307, vol. 3, Issue 4, Sep. 2013. pp. 8-11.

\* cited by examiner

BAYESIAN NETWORK BASED HYBRID MACHINE LEARNING

BACKGROUND

The present invention relates to the electrical, electronic and computer arts, and more specifically, to machine learning.

A Bayesian network is a probabilistic graphical model (a type of statistical model) that represents a set of random variables and their conditional dependencies via a directed acyclic graph (DAG). For example, a Bayesian network could represent the probabilistic relationships between diseases and symptoms. Given symptoms, the network can be used to compute the probabilities of the presence of various diseases.

In the simplest case, a Bayesian network is specified by an expert and is then used to perform inference. In other applications the task of defining the network is too complex for humans. In this case the network structure and the parameters of the local distributions must be learned from data. Automatically learning the graph structure of a Bayesian network (BN) is a challenge pursued within machine learning.

Because a Bayesian network is a complete model for the variables and their relationships, it can be used to answer probabilistic queries about them. For example, the network can be used to find out updated knowledge of the state of a subset of variables when other variables (the evidence variables) are observed. In order to fully specify the Bayesian network and thus fully represent the joint probability distribution, it is necessary to specify for each node X the probability distribution for X conditional upon X's parents. The distribution of X conditional upon its parents may have any form. Often these conditional distributions include parameters which are unknown and must be estimated from data, sometimes using the maximum likelihood approach. A more fully Bayesian approach to parameters is to treat parameters as additional unobserved variables and to compute a full posterior distribution over all nodes conditional upon observed data, then to integrate out the parameters.

SUMMARY

Principles of the invention provide techniques for Bayesian network based hybrid machine learning. In one aspect, an exemplary computer-implemented method includes initializing, in the memory of a computer, a Bayesian network structure that combines a first neural network configured for supervised learning with a second neural network configured for supervised learning. The method further includes receiving, by a processor of the computer, data that includes data with labels and data without labels, the labels indicating fraud or not fraud. For the data without labels, the method includes assigning pseudo labels that estimate fraud or not fraud; a fuzzy rules system assigns the pseudo labels. The method also includes establishing weights of the first neural network by processing the data with labels using the first neural network, and establishing weights of the second neural network by processing the data with pseudo labels using the second neural network. The method then includes producing system outcomes by combining the results of the first and second neural networks; obtaining, by the processor, feedback on the system outcomes; and updating the Bayesian network structure in response to the feedback by the second neural network modifying parameters of the fuzzy rules system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Improved transparency of fraud detection.

Evolving sensitivity and confidence of fuzzy rule set.

Progressive replacement of domain expert knowledge by machine learned probabilities.

These and other features and advantages of the present invention will become apparent from the following detailed description of illustrative embodiments thereof, which is to be read in connection with the accompanying drawings.

BRIEF DESCRIPTION OF THE DRAWINGS

FIG. 9 depicts a computer system that may be useful in implementing one or more aspects and/or elements of the

DETAILED DESCRIPTION

Principles of the invention provide techniques for Bayesian network based hybrid machine learning. Certain exemplary embodiments of the invention provide a hybrid machine learning system evaluating fraudulent risk associated with any claim reimbursement system. Other embodiments are applicable to estimation of other risks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
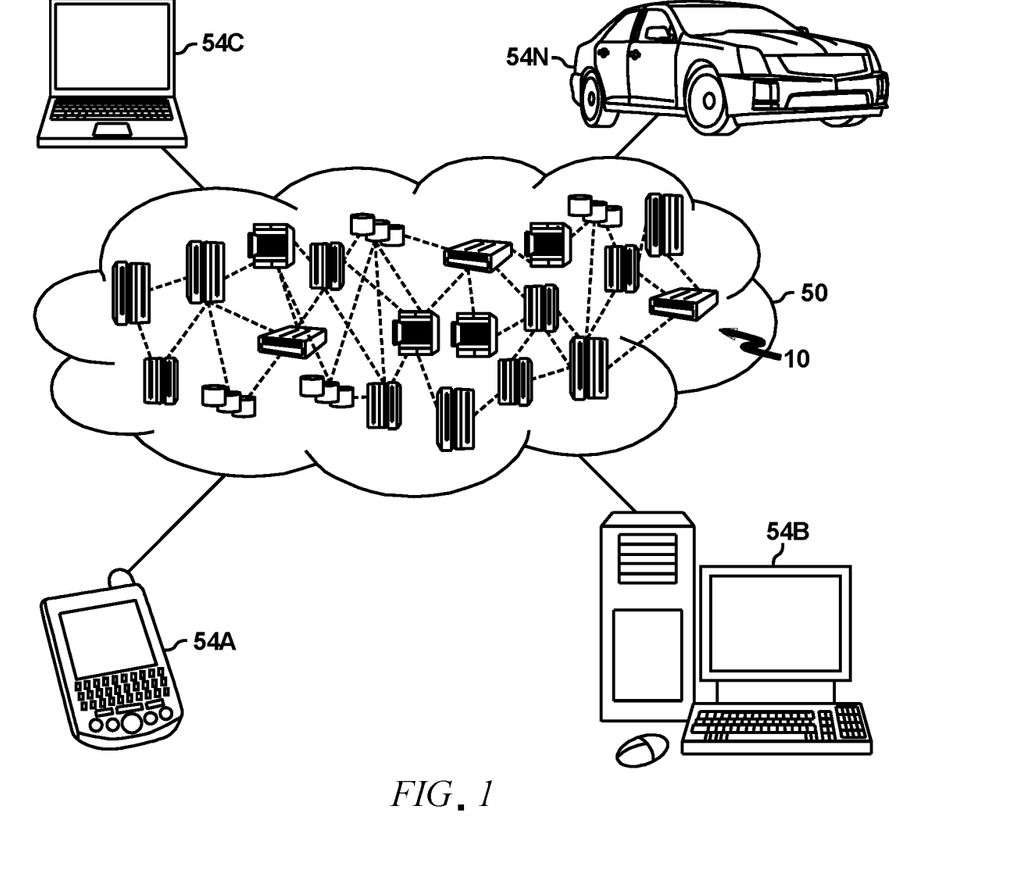
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
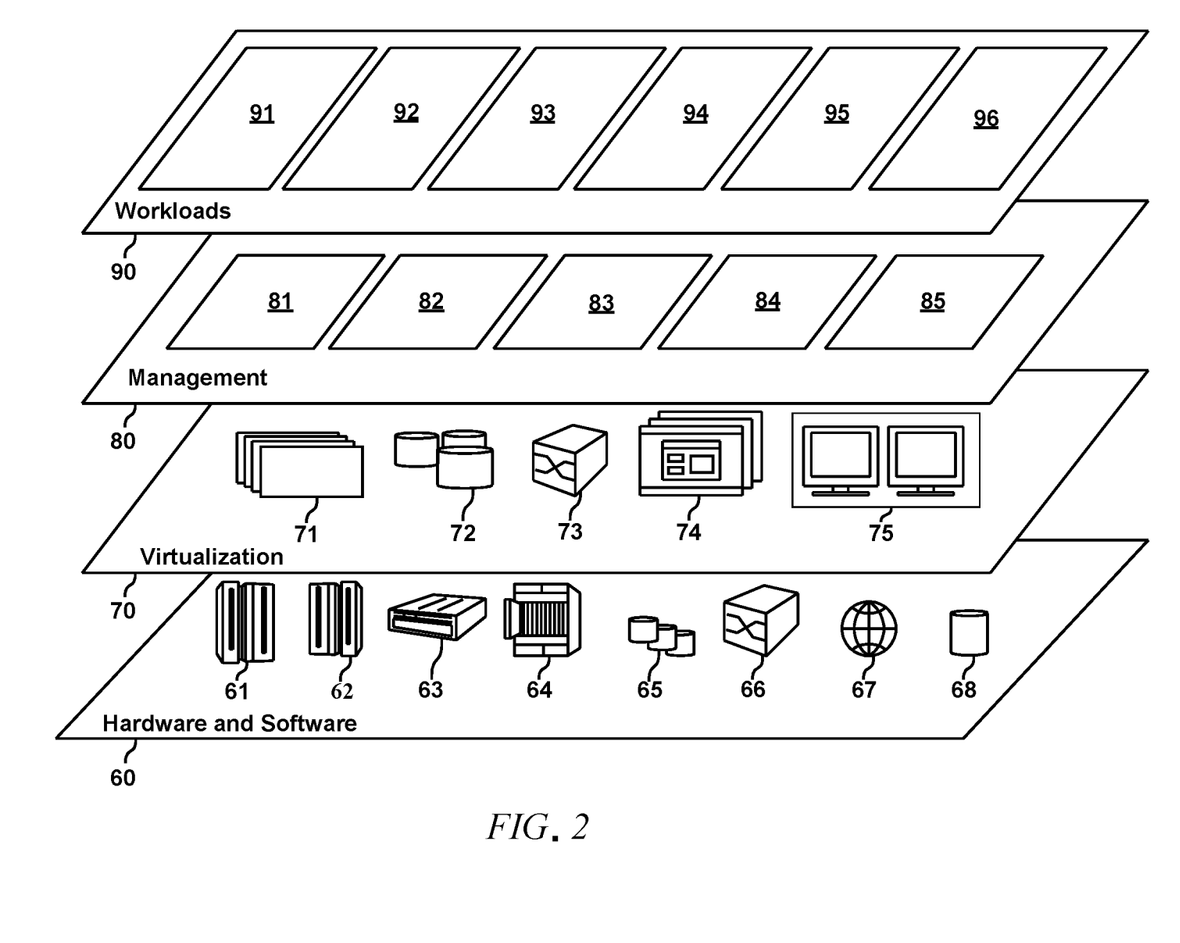
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a Bayesian network based hybrid machine learning module 96.

Figure 3:
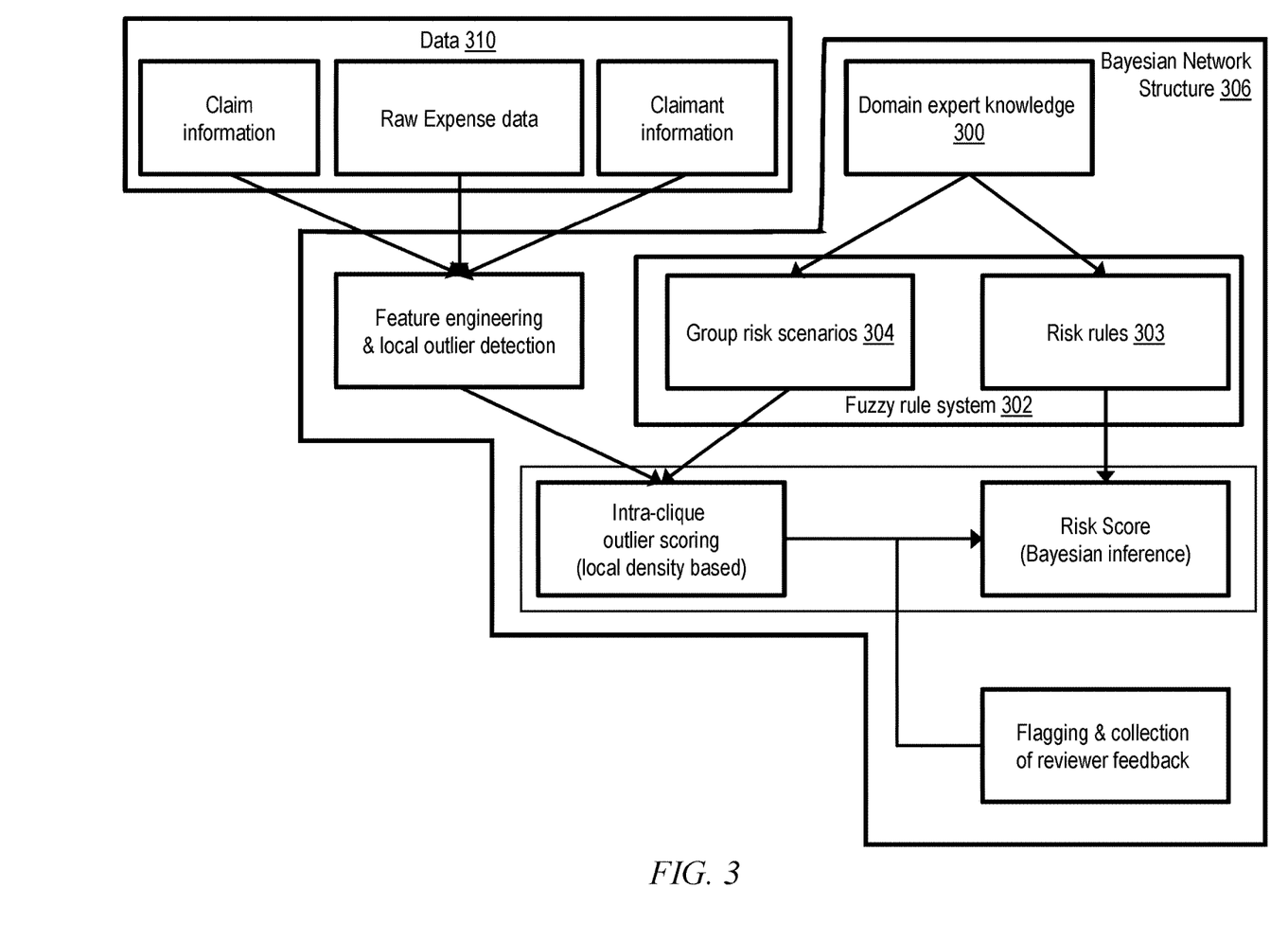
FIG. 3 depicts a Bayesian network structure according to an exemplary embodiment.

Certain exemplary embodiments of the invention provide the hybrid machine learning module 96 and implement the module for fraud risk estimation. Other embodiments are applicable to estimation of other risks. Referring to FIG. 3, one or more embodiments integrate human domain expert knowledge 300 with supervised machine learning in a Bayesian network structure 306. The Bayesian network structure 306 is constructed with a modular design by connecting fraud scenarios, fraud cases and fraud risk features into one network. In each individual module of the network (e.g., a specific fraud scenario like inappropriate expenses), the risk assessment employs either a fully machine learning model or a hybrid machine learning model for overcoming a lack of labeled training data in certain fraud scenarios.

According to at least one embodiment of the present invention, the Bayesian network structure 306 provides a natural framework for codifying domain expert knowledge 300 around specific fraud scenarios 304 into independence assumptions of the conditional probability function that quantifies fraud risk. The resulting network structure organized around actionable scenarios facilitates the estimation of the underlying model parameters. More particularly, the model allows for definition of fuzzy rules 303 and their implementation in a hybrid risk scoring algorithm (hybrid machine learning module). Thus, one or more embodiments implement a risk estimation workflow as shown in FIG. 3.

Domain expert knowledge 300 is used to define a fuzzy rule system 302, which includes fuzzy rules 303 as well as group risk scenarios 304 within a Bayesian network structure 306. One parameter in the risk rule definitions is a measure A of rule confidence, further discussed below; the rule confidence parameter enables a hybrid risk scoring algorithm to utilize any level of human expert knowledge as a basis for the fuzzy rule system 302. Thus, human expert domain knowledge is transformed into two formats: one format includes the specific fraud scenarios, fraud cases, and risk features 304; the other format includes the fuzzy rules 303. Starting from the domain expert knowledge 300 enables embodiments of the invention to meet requirements of transparency, accountability, and reproducibility for highly regulated legal domains.

In some situations the domain expert knowledge 300 cannot detect a risk, for example when risk scenarios are characterized by weak signal patterns (e.g., sophisticated fraud, in which the risk signals are intentionally concealed). In other situations no identified fraud cases exist for machine training because no fraud detection process existed before the tool development. In such situations, one or more embodiments of the invention advantageously provide for computer-implemented feature engineering and local outlier detection 308 in order to identify potential risk scenarios. Feature engineering means obtaining feature data and matching it to a pre-defined list to produce a Boolean value, e.g., comparing reported expense to standard deviation from average expense in that category and normalizing the comparison, or comparing reported location of an expense to credit card transaction data. For example, one feature datum could be: "Cash expense >$100". Empirically, cash expenses may have a median around $45 with a standard deviation of $15. $100 is already beyond 3× standard deviation and is considered to be an outlier, which would produce a Boolean value of "TRUE" for potential risk.

Feature data are grouped together to compose risk scenarios. This is called "local grouping." An example of local grouping is the construction of a "Duplicate Expenses" risk scenario, in which different claimants use the same receipt to claim the same expense multiple times. This scenario may include the following grouping features: 1) same receipt image; 2) same vendor; 3) same expense date; 4) same expense amount. These features are grouped together to form a risk scenario (local group).

The Bayesian network structure 306 receives data 310 and probabilistically scores the risk of fraud associated with the data through application of the fuzzy rule system 302. The Bayesian network structure 306 also quantifies the risk probability of certain behaviors by implementing intra-clique outlier detection 312 of risk patterns. Intra-clique outlier scoring is an extension of local grouping, combining aggregate feature risk scores to produce an overall group/scenario risk score. Taking the duplicate expense risk scenario as an example, the intra-clique outlier score is the probability of being risky in response to all features extracted from the data—e.g., same receipt image and same vendor. If the combination of all features is a statistical outlier (e.g., in past experience there has been a very low frequency of multiple expenses with same receipt image and same vendor), the Bayesian network structure 306 will predict a high probability of being risky.

Additionally, the Bayesian network structure 306 captures direct feedback 314 from expense auditors, the end users of the system. The Bayesian network structure 306 self-updates by digesting the captured feedback 314 to update the fuzzy rules 303. Such an approach is particularly advantageous where there are no identified fraud cases available to train supervised machine learning.

Figure 4:
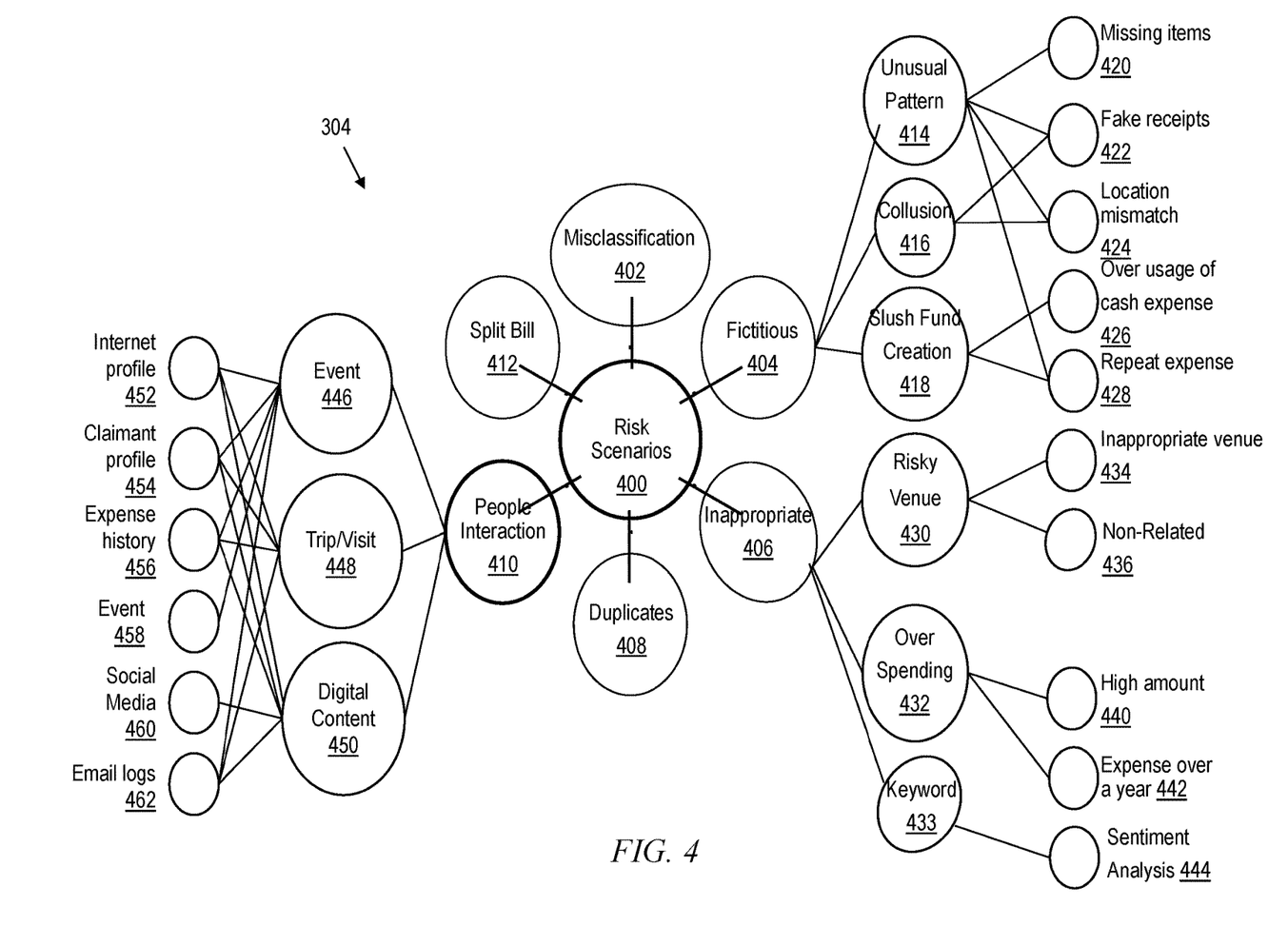
FIG. 4 depicts some exemplary risk scenarios that can be scored by the Bayesian network structure of FIG. 3, according to an exemplary embodiment.

FIG. 4 depicts some exemplary risk scenarios 304 that can be scored by the Bayesian network structure 306 using the fuzzy rules 303. Six potential categories of risk scenario 400 include misclassification of expenses 402, fictitious expenses 404, inappropriate expenses 406, duplicate expenses 408, improper people interactions 410, and improperly split bills 412. Referring to the fictitious expenses 404, exemplary scenarios include unusual patterns of expenditure 414, collusion 416, and slush fund creation 418. Certain signals of fictitious expenses 404 include missing items 420, fake receipts 422, location mismatch 424, over usage of cash expense 426, and repeat (not duplicate) expenses 428 (e.g., same expense reported on successive days). The fuzzy rules 303 are applied to identify level of risk in response to how much the signals differ from statistical average signals. The group risk scenarios 304 are applied to identify which type of fraud should be investigated.

For example, in case a typical fraudulent claim, location info extracted from receipt may indicate a mismatch in location, while the claim may also lack an item from frequent item set analysis. The fuzzy rules 303 would flag the claim to be reviewed for unusual expense pattern, and the group risk scenario would predict a potential fraudulent category of "Fictitious" claim with a certain risk probability, e.g., 60%. Similarly, consider a claim with "over usage" of cash payment, the intra-clique statistical outlier detection may determine to boost the predicted fraudulent probability for example, up to 85%.

Figure 5:
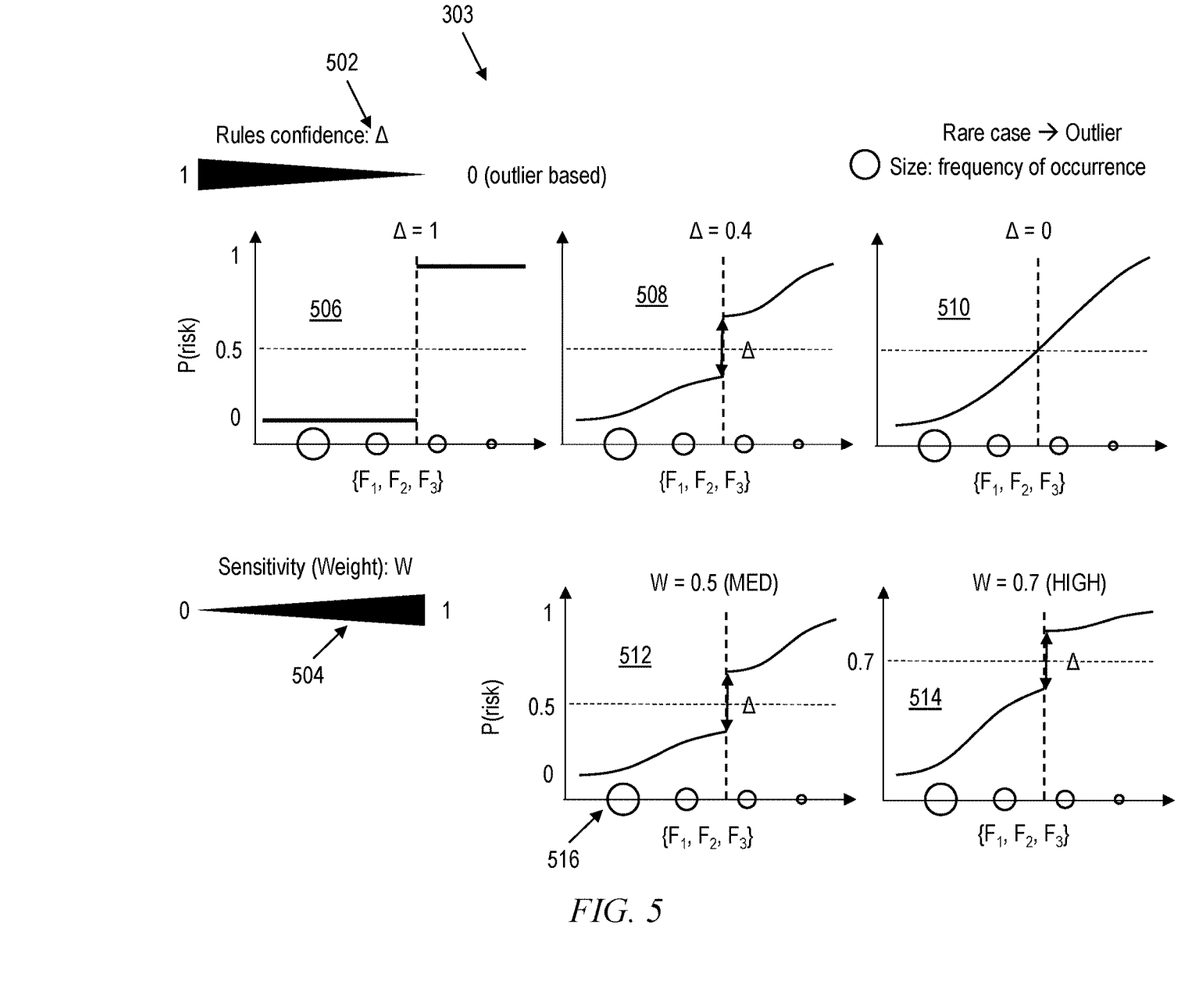
FIG. 5 depicts a fuzzy rule scoring heuristic usable in the Bayesian network structure of FIG. 3, according to an exemplary embodiment.

Still referring to FIG. 5, depending on a rules confidence parameter Δ 502 and a sensitivity parameter W 504, the fuzzy rule 303 may indicate different probabilities of a claim being fraudulent in response to the cash payment exceeding the mode value of cash payments. Considering the rules confidence parameter, for Δ=1 (an absolute rule) 506, then up until the cash payment exceeds one standard deviation above the mode value, the fuzzy rule 303 will return a zero probability of fraud; when the cash payment equals or exceeds one standard deviation above the mode value, then the fuzzy rule 303 will return a 1.0 probability of fraud. On the other hand, for Δ=0.4 508, the fuzzy rule 303 will return a gradually increasing probability of the report being fraudulent as the cash payment approaches one standard deviation above the mode value, then at one standard deviation there will be a discontinuous jump to a higher probability of fraud, then the returned probability of fraud will approach 1.0 as the cash payment value continues to increase beyond one standard deviation above the mode value. For Δ=0 510, the fuzzy rule 303 will return a continuously increasing probability of fraud as the cash payment value exceeds the mode value. Considering the sensitivity parameter, for W=0.5 512, the "center" probability at one standard deviation above the mode value of cash payments will be 0.5. For W=0.7 514, the "center" probability will be 0.7. Note in FIG. 5, the areas of the circles (e.g., 516) across the bottom of the graphs indicate the relative likelihoods of particular values of cash payment, with smaller circles being less likely than larger circles.

Referring again to FIG. 4, exemplary scenarios of the inappropriate expenses 406 include risky venues 430, over spending 432, etc. (e.g., those identified by keyword 433). Certain signals of inappropriate expenses 406 include inappropriate venue identification 434, non-claim related venue identification 436, as well as high money amounts 440, expenses over a year old 442, and sentiment analysis 444. Using vendor category identification codes provided by the business unit's credit card company, a legal team can manually classify vendor categories as claim-related or non-claim related as part of the domain expert knowledge 300 that feeds into the group risk scenarios 304. "Sentiment analysis" is a natural language processing function that can be applied to the freeform text of an expense report explanation to assess a probability whether there is fraudulent intent to the explanation.

Referring to the people interactions 410, exemplary scenarios include claims related to an event 446, claims related to a trip or visit 448, or claims related to digital content 450. Certain signals whether a claimed interaction actually occurred include internet profiles 452, the claimant's profile 454, the claimant's expense history 456, the claimant's event attendance 458, social media postings 460, and e-mail logs 462. That is, if there is no evidence (other than the expense report) that a claimant ever interacted with a person at all, then the expense report has a basic 1.0 probability of fraud. On the other hand, if it is not clear whether a claimant actually met with a person, but there are numerous e-mails between the claimant and another person, then a fuzzy rule 303 might assign a relatively low probability of fraud.

Figure 6:
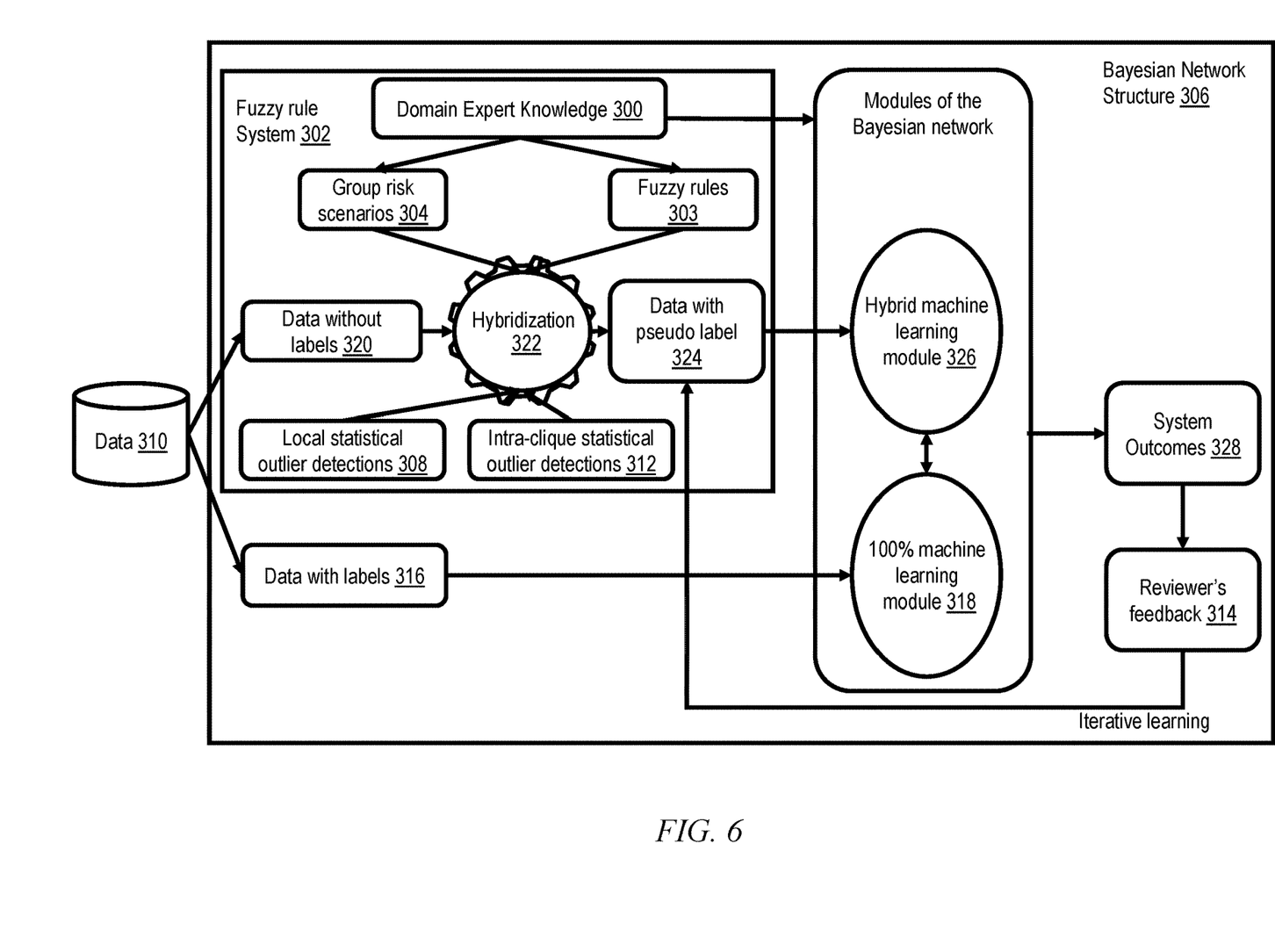
FIG. 6 depicts operation of the Bayesian network structure of FIG. 3, according to an exemplary embodiment.

FIG. 6 illustrates in greater detail the operation of the Bayesian network structure 306 that is shown in FIG. 3. The Bayesian network structure 306 receives data 310. Some of the data 310 is data with labels 316, i.e., labeled "fraud" or "not fraud" corresponding to probability of risk 1.0 or 0. Other of the data 310 is data without labels 320.

The data with labels 316 feeds directly into a 100% machine learning module 318. The machine learning module 318 learns deterministic rules for applying absolute (non-probabilistic) "fraud" or "not fraud" labels to similar data without labels 320. In one or more embodiments the machine learning module 318 is implemented in a cognitive neural network that is configured for supervised learning, using the labels 316.

Generally, a cognitive neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A cognitive neural network can implement supervised, unsupervised, or semi-supervised machine learning.

The data without labels 320 feeds into a hybridization module 322. The hybridization module 322 applies the fuzzy rules 303, the group risk scenarios 304, and local and intra-clique statistical outlier detections 308, 312 to the data without labels 320, as discussed above with reference to FIG. 3. The hybridization module 322 produces data with pseudo labels 324, for example, "fraud" for data that has a probability of fraud exceeding the sensitivity of a particular fuzzy rule or "not fraud" for data that has a probability of fraud less than the sensitivity of a particular fuzzy rule. The data with pseudo labels 324 feeds into a hybrid machine learning module 326, which interacts with the 100% machine learning module 318. In one or more embodiments, the hybrid machine learning module 326 is implemented in a cognitive neural network that is configured for supervised learning. The hybrid machine learning module 326 learns risk confidence parameter Δ and sensitivity W for each of the fuzzy rules 303 as further discussed below. Thus, the hybrid machine learning module 326 works with the 100% machine learning module 318 to update and improve the accuracy of the fuzzy rules 303. It is called a "hybrid" because it combines supervised machine learning with an expert system.

The 100% machine learning module 318 and the hybrid machine learning module 326 produce system outcomes 328 (i.e. each reimbursement claim fed into the Bayesian network structure 306 is assigned a probability of fraud). Reviewers (e.g., expense auditors) then provide feedback 314 regarding whether each claim was or was not determined to be fraudulent, for at least a random sample of the reimbursement claims. Thus, the feedback 314 comprises real labels for the data with pseudo labels 324 that is fed into the hybrid machine learning module 326, which adjusts the confidence parameters A and the sensitivity parameters W in response to the feedback 314.

Thus, one or more embodiments of the invention provide a Bayesian network structure 306 that incorporates a hybrid machine learning module 326 that addresses the problem of sparse and imbalanced labels in the training data via two measures. According to the model, fuzzy rules 303 and a local density outlier approach 308 augment learned probabilities for domains in feature space with sparse labels (i.e. a combination of data with labels 316 and data without labels 320). The Bayesian network structure 306 assigns pseudo labels 324 in response to fuzzy rules 303 and group risk scenarios 304, which are obtained from domain expert knowledge 300. However, the hybrid machine learning module 326 reduces the influence of domain expert knowledge 300 as reviewer feedback 314 (e.g., labeled risk scenarios) is collected. Thus, the Bayesian network structure 306 inputs machine learning of historical data and assigns probabilities of fraud to each new claim; for example, if during a one year period 99% of expenses with a particular characteristic are a fraud risk, then any new claim with the same characteristic will be assigned a 99% risk of fraud.

Figure 7:
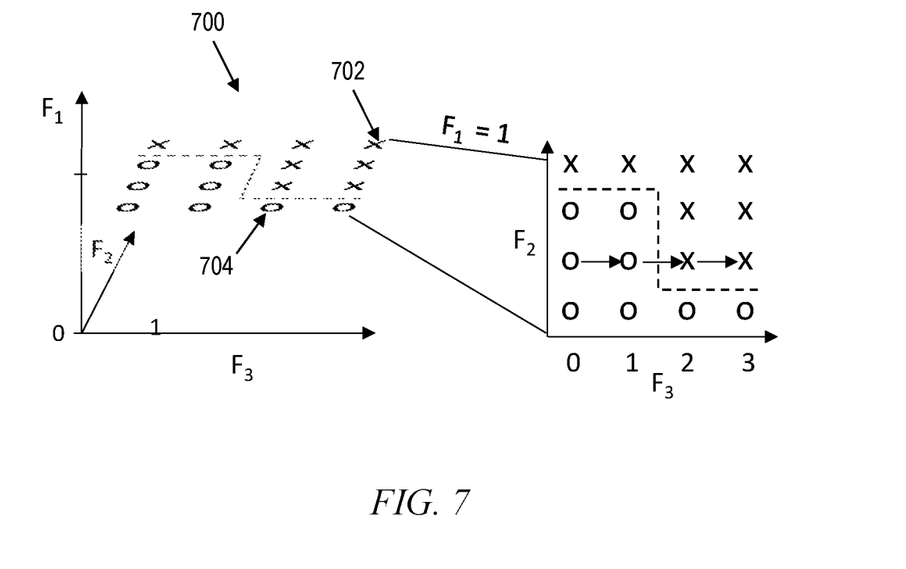
FIG. 7 depicts assignment of pseudo labels by a fuzzy rule system of the Bayesian network structure of FIG. 3, according to an exemplary embodiment.

FIG. 7 depicts an exemplary assignment of pseudo labels 700 by the fuzzy rule system 302. "X" symbols (e.g., 702) represent "fraud" pseudo labels; "0" symbols (e.g., 704) represent "not fraud" pseudo labels. The axes represent different risk signals. The graph shown in FIG. 7 is a simplified example, and in practice there could be many more than three axes or signals considered. For purposes of the example shown in FIG. 7, F1, F2, F3 respectively represent a number of duplicate claims, or a number of non-reimbursable items claimed. The fuzzy rule system 302 is set up to accept innocent errors in claims. Thus, for example, it is permissible to have one duplicate expense in combination with as many as two non-reimbursable items.

Figure 8:
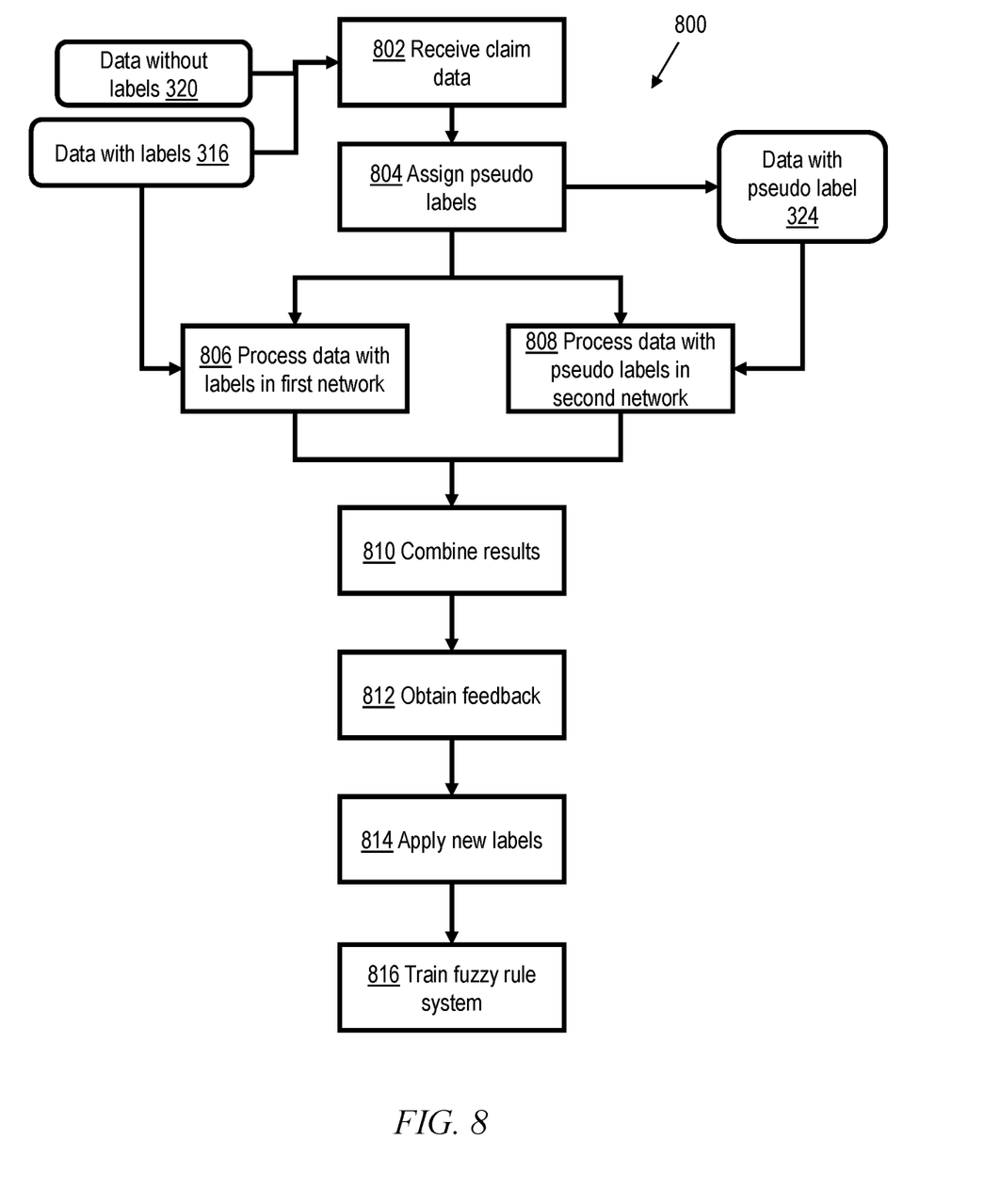
FIG. 8 depicts in flowchart form an exemplary method implemented by the Bayesian network structure of FIG. 3, according to an exemplary embodiment.

FIG. 8 depicts in flowchart form an exemplary summary method 800 that is implemented by the Bayesian network structure 306 according to an embodiment of the invention.

At block 802, the Bayesian network structure 306 receives claim data that includes data 316 with labels and data 320 without labels. The labels indicate fraud or not fraud. At block 804, the Bayesian network structure 306 assigns pseudo labels 324 to the data without labels. The pseudo labels 324 estimate fraud or not fraud. At block 806, the Bayesian network structure 306 processes the data 316 with labels using a first cognitive neural network 318 (the 100% machine learning module). At block 808, which can be performed before, after, or concurrent with the method of block 806, the Bayesian network structure 306 processes the data 320 with pseudo labels using a second cognitive neural network 326 (the hybrid machine learning module). At block 810, the Bayesian network structure 306 produces system outcomes by combining the results of the first and second cognitive neural networks. At block 812, the Bayesian network structure 306 obtains reviewer feedback on the system outcomes. At block 814, the Bayesian network structure 306 applies new labels to the data with pseudo labels, in response to the reviewer feedback, and at block 816, the hybrid machine learning module 326 trains the fuzzy rule system 302 by updating the fuzzy rules 303 in response to the feedback.

Given the discussion thus far, it will be appreciated that, in general terms, an exemplary method, according to an aspect of the invention, includes initializing, in the memory of a computer, a Bayesian network structure that combines a first neural network configured for supervised learning with a second neural network configured for supervised learning. The method further includes receiving, by a processor of the computer, data that includes data with labels and data without labels. For the data without labels, the method includes assigning pseudo labels; a fuzzy rules system assigns the pseudo labels. The method also includes establishing weights of the first neural network by processing the data with labels using the first neural network, and establishing weights of the second neural network by processing the data with pseudo labels using the second neural network. The method then includes producing system outcomes by combining the results of the first and second neural networks; obtaining, by the processor, feedback on the system outcomes; and updating the Bayesian network structure in response to the feedback by the second neural network modifying parameters of the fuzzy rules system. According to one or more embodiments, the pseudo labels are assigned in response to fuzzy rules. For example, the fuzzy rules assess probability of fraud in response to identifying statistical outliers in claim data. According to one or more embodiments, the fuzzy rules are developed in response to domain expert knowledge. In certain such embodiments, the second cognitive neural network may update sensitivity and confidence parameters of the fuzzy rules in response to the feedback. According to one or more embodiments, the pseudo labels are assigned in response to fuzzy rules and in response to group risk scenarios. In certain such embodiments, the group risk scenarios are developed in response to domain expert knowledge.

Figure 9:
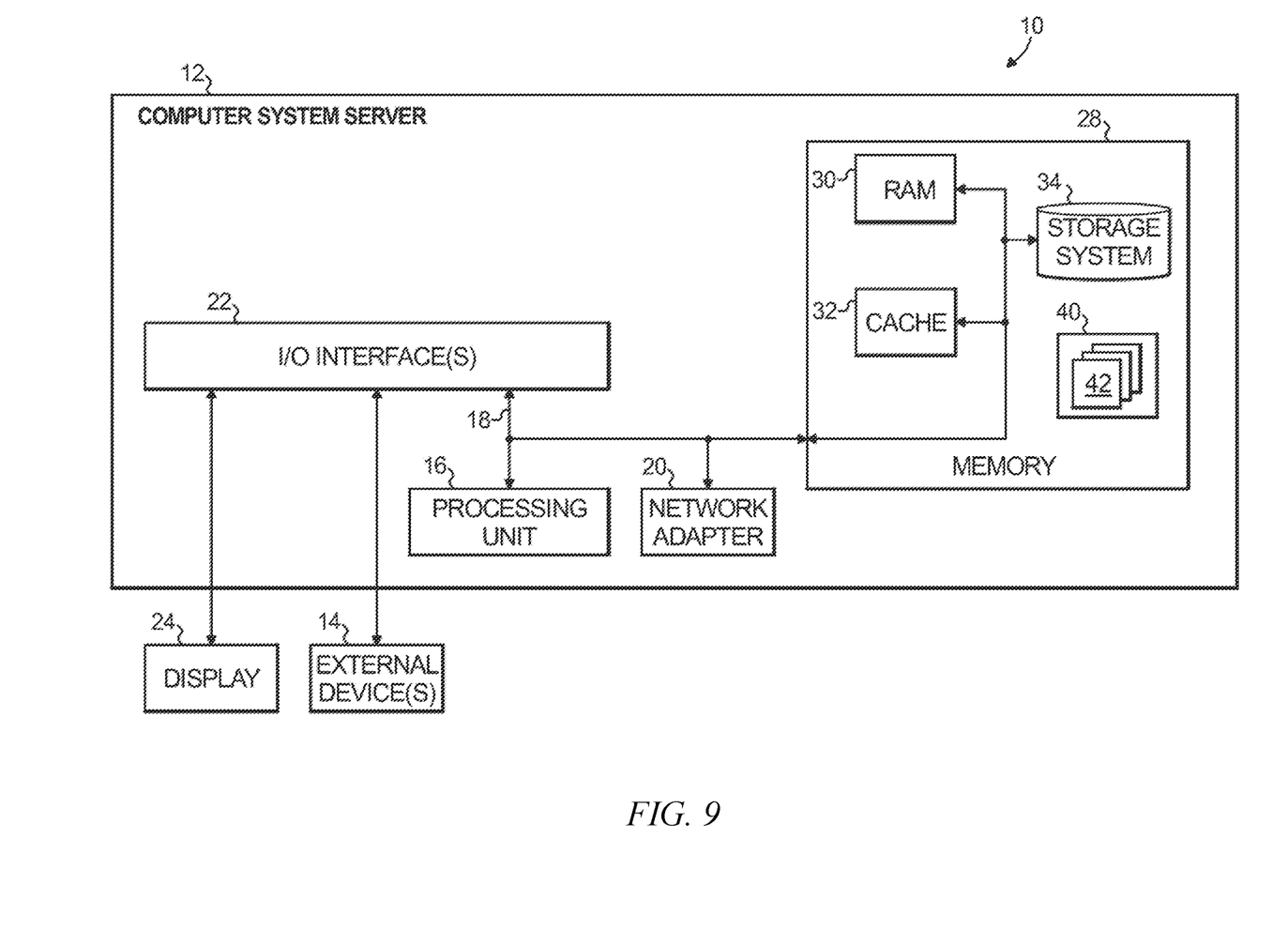

One or more embodiments of the invention, or elements thereof, can be implemented in the form of an apparatus including a memory that embodies computer executable instructions and at least one processor that is coupled to the memory and operative by the computer executable instructions to perform exemplary method steps. Other embodiments of the invention can be implemented in the form of a non-transitory computer readable medium that embodies computer executable instructions as described. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of constructing a Bayesian network structure that combines a first neural network configured for supervised learning with a second neural network configured for supervised learning, the method comprising:
    initializing the Bayesian network structure in a memory of a computer system;
    receiving, by the computer system, electronic data that includes data with labels and data without labels;
    for the data without labels, assigning pseudo labels, wherein a fuzzy rules system assigns the pseudo labels;
    establishing weights of the first neural network by processing the data with labels using the first neural network;
    establishing weights of the second neural network by processing the data with pseudo labels using the second cognitive neural network;
    producing system outcomes by combining results of the first and second neural networks;
    obtaining, by the computer system, feedback on the system outcomes; and
    updating the Bayesian network structure in response to the feedback by the second neural network modifying parameters of the fuzzy rule system.

2. The method of claim 1 wherein the pseudo labels are assigned in response to fuzzy rules.

3. The method of claim 2 wherein the fuzzy rules assess probability of fraud in response to identifying statistical outliers in the data.

4. The method of claim 2 wherein the fuzzy rules are developed in response to domain expert knowledge.

5. The method of claim 4 wherein the second cognitive neural network updates sensitivity and confidence parameters of the fuzzy rules in response to the feedback.

6. The method of claim 1 wherein the pseudo labels are assigned in response to fuzzy rules and in response to group risk scenarios.

7. The method of claim 6 wherein the group risk scenarios are developed in response to domain expert knowledge.

8. A non-transitory computer readable medium embodying computer executable instructions which when executed by a computer cause the computer to facilitate the method of:
    initializing in the computer a Bayesian network structure that combines a first neural network configured for supervised learning with a second neural network configured for supervised learning;
    receiving, by the computer, data that includes data with labels and data without labels;
    for the data without labels, assigning pseudo labels, wherein a fuzzy rules system assigns the pseudo labels;
    establishing weights of the first neural network by processing the data with labels using the first neural network;
    establishing weights of the second neural network by processing the data with pseudo labels using the second neural network;
    producing system outcomes by combining the results of the first and second neural networks;
    obtaining, by the computer, feedback on the system outcomes; and updating the Bayesian network structure in response to the feedback by the second neural network modifying parameters of the fuzzy rule system.

9. The medium of claim 8 wherein the pseudo labels are assigned in response to fuzzy rules.

10. The medium of claim 9 wherein the fuzzy rules assess probability of fraud in response to identifying statistical outliers in insurance claim data.

11. The medium of claim 9 wherein the fuzzy rules are developed in response to domain expert knowledge.

12. The medium of claim 11 wherein the second cognitive neural network updates sensitivity and confidence parameters of the fuzzy rules in response to the feedback.

13. The medium of claim 8 wherein the pseudo labels are assigned in response to fuzzy rules and in response to group risk scenarios.

14. The medium of claim 13 wherein the group risk scenarios are developed in response to domain expert knowledge.

15. An apparatus comprising:
a memory embodying computer executable instructions; and
at least one processor, coupled to the memory, and operative by the computer executable instructions to implement a method of:
initializing in the memory a Bayesian network structure that combines a first neural network configured for supervised learning with a second neural network configured for supervised learning;
receiving, by the processor, data that includes data with labels and data without labels, the labels indicating fraud or not fraud;
for the data without labels, assigning pseudo labels, wherein a fuzzy rules system assigns the pseudo labels;
establishing weights of the first neural network by processing the data with labels using the first neural network;
establishing weights of the second neural network by processing the data with pseudo labels using the second neural network;
producing system outcomes by combining the results of the first and second neural networks;
obtaining, by the processor, feedback on the system outcomes; and
updating the Bayesian network structure in response to the feedback by the second neural network modifying parameters of the fuzzy rule system.

16. The apparatus of claim 15 wherein the pseudo labels are assigned in response to fuzzy rules.

17. The apparatus of claim 16 wherein the fuzzy rules assess probability of fraud in response to identifying statistical outliers in insurance claim data.

18. The apparatus of claim 17 wherein the fuzzy rules are developed in response to domain expert knowledge.

19. The apparatus of claim 17 wherein the second cognitive neural network updates sensitivity and confidence parameters of the fuzzy rules in response to the feedback.

20. The apparatus of claim 15 wherein the pseudo labels are assigned in response to fuzzy rules and in response to group risk scenarios.

* * * * *